United States Patent
Storey

(10) Patent No.: US 11,491,631 B2
(45) Date of Patent: Nov. 8, 2022

(54) GAS POWERED TOOL AND A METHOD FOR RETAINING AN ISOLATING VALVE OF A GAS POWERED TOOL IN AN ISOLATING STATE

(71) Applicant: OGLESBY & BUTLER RESEARCH & DEVELOPMENT LIMITED, Carlow (IE)

(72) Inventor: John Joseph Storey, Portlaoise (IE)

(73) Assignee: OGLESBY & BUTLER RESEARCH & DEVELOPMENT LIMITED, Carlow (IE)

( * ) Notice: Subject to any disclaimer, the term of this patent is extended or adjusted under 35 U.S.C. 154(b) by 457 days.

(21) Appl. No.: 16/610,138

(22) PCT Filed: May 8, 2018

(86) PCT No.: PCT/IE2018/000006
§ 371 (c)(1),
(2) Date: Nov. 1, 2019

(87) PCT Pub. No.: WO2018/203319
PCT Pub. Date: Nov. 8, 2018

(65) Prior Publication Data
US 2020/0086472 A1    Mar. 19, 2020

(30) Foreign Application Priority Data

May 5, 2017 (IE) ...................................... 2017/0099
Aug. 14, 2017 (IE) ...................................... 2017/0163

(51) Int. Cl.
B23K 3/00         (2006.01)
B25F 1/02         (2006.01)
(Continued)

(52) U.S. Cl.
CPC ................. *B25F 1/02* (2013.01); *B23K 3/022* (2013.01); *B23K 3/026* (2013.01); *B23K 3/043* (2013.01); *F23D 14/72* (2013.01)

(58) Field of Classification Search
CPC ........... B25F 1/02; B23K 3/022; B23K 3/026; B23K 3/043; B23K 3/021–024; B23K 5/00–24; F23D 14/72
(Continued)

(56) References Cited

U.S. PATENT DOCUMENTS 1,744,448 A * 1/1930 Cowles ................... B23K 3/022
126/413
1,768,147 A * 6/1930 Raymond .............. B23K 3/023
126/414
(Continued)

FOREIGN PATENT DOCUMENTS

EP     0 118 282 A1    9/1984
EP     0 899 063 A2    3/1999
(Continued)

OTHER PUBLICATIONS

International Search Report for PCT/IE2018/000006 dated Sep. 26, 2018 [PCT/ISA/210].
(Continued)

*Primary Examiner* — Kiley S Stoner
(74) *Attorney, Agent, or Firm* — Sughrue Mion, PLLC

(57) ABSTRACT

A gas powered tool (70) comprising a housing (73) and a soldering tool element (72) releasably coupled to the housing (73). A latching element (105) pivotally mounted on a pivot pin (106) in the housing (73) is retained in a non-latching state (FIG. 26) by an abutment element (102) which is urgeable into the housing (73) by the soldering tool element (72) when the soldering tool element (72) is coupled to the housing (73). The latching element (105) is spring
(Continued)

Figure 16A:
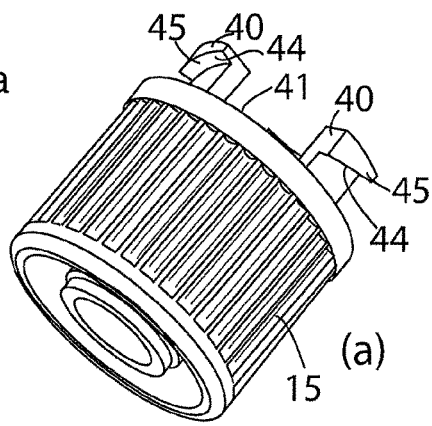

biased in the direction of the arrow E from the non-latching state to a latching state (FIG. 27) for latching a switching element (89) in a first state to in turn retain an isolating valve (86), which supplies fuel gas from a reservoir (78) in the housing (73) to the soldering tool element (72), in the isolating state. On decoupling of the soldering tool element (72) from the housing (73), the abutment element (102) is spring urged outwardly and disengages the latching element (105). The latching element (105) pivots about the pivot pin from the non-latching state to the latching state engaging the switching element (89) in the first state, thereby retaining the isolating valve (86) in the isolating state isolating the soldering tool element (72) from the fuel gas in the fuel gas reservoir (78) in the housing (73).

20 Claims, 11 Drawing Sheets

(51) Int. Cl.
  *B23K 3/02* (2006.01)
  *B23K 3/04* (2006.01)
  *F23D 14/72* (2006.01)
(58) Field of Classification Search
  USPC .............................................. 228/51–55, 902
  See application file for complete search history.

(56) References Cited

U.S. PATENT DOCUMENTS

| | | | | | |
|---|---|---|---|---|---|
| 2,094,795 | A * | 10/1937 | Johnson | ............... | B23K 3/0615 219/230 |
| 4,119,088 | A * | 10/1978 | Sim | ................ | B23K 3/022 222/3 |
| 4,641,632 | A * | 2/1987 | Nakajima | ............... | F23D 14/18 126/413 |
| 4,688,551 | A * | 8/1987 | Nakajima | ............... | F23D 14/60 126/414 |
| 4,691,691 | A * | 9/1987 | Patenaude | ............. | B23K 3/023 431/255 |
| 4,805,593 | A * | 2/1989 | Hsu | ................ | B23K 3/022 126/414 |
| 4,858,593 | A * | 8/1989 | Hsu | ................ | B23K 3/023 126/413 |
| 4,966,128 | A * | 10/1990 | Wang | ................ | F23D 14/28 126/413 |
| 5,007,405 | A * | 4/1991 | Hsu | ................ | B23K 3/023 126/413 |
| 5,083,916 | A * | 1/1992 | Glennon | ................ | F23D 14/28 431/344 |
| 5,215,076 | A * | 6/1993 | Oglesby | ................ | B23K 3/022 126/238 |
| 5,490,496 | A * | 2/1996 | Lin | ................ | F23D 14/40 431/255 |
| 5,667,193 | A * | 9/1997 | Chrzanowski | .......... | F23D 14/40 251/243 |
| 5,803,061 | A * | 9/1998 | Kao | ................ | B23K 3/022 126/413 |
| 6,063,329 | A * | 5/2000 | Tsai | ................ | F23D 14/28 431/344 |
| 6,244,853 | B1 * | 6/2001 | Oglesby | ................ | F23D 14/38 126/413 |
| 6,296,476 | B1 * | 10/2001 | Tsai | ................ | F23D 14/72 431/153 |
| 10,702,938 | B1 * | 7/2020 | Snyder | ................ | B23K 7/00 |
| 2003/0008254 | A1 * | 1/2003 | Tsai | ................ | F23D 14/72 431/153 |
| 2003/0168493 | A1 * | 9/2003 | Hirano | ................ | B23K 3/022 228/51 |
| 2004/0043347 | A1 * | 3/2004 | Oglesby | ................ | B23K 3/021 126/414 |
| 2004/0094602 | A1 * | 5/2004 | Lin | ................ | B23K 3/02 228/51 |
| 2007/0000907 | A1 * | 1/2007 | Lin | ................ | B23K 3/023 219/494 |
| 2014/0061170 | A1 * | 3/2014 | Lindsay | ................ | B23K 26/38 219/121.54 |
| 2019/0293282 | A1 * | 9/2019 | Berard | ................ | F23D 14/06 |

FOREIGN PATENT DOCUMENTS

| | | | | |
|---|---|---|---|---|
| GB | WO-8707549 A2 | * | 12/1987 | |
| GB | 2 250 338 A | | 6/1992 | |
| GB | 2323431 A | * | 9/1998 | ............. B23K 3/022 |
| WO | WO-9500280 A1 | * | 1/1995 | ............. B23K 3/022 |

OTHER PUBLICATIONS

Written Opinion for PCT/IE2018/000006 dated Sep. 26, 2018 [PCT/ISA/237].

* cited by examiner

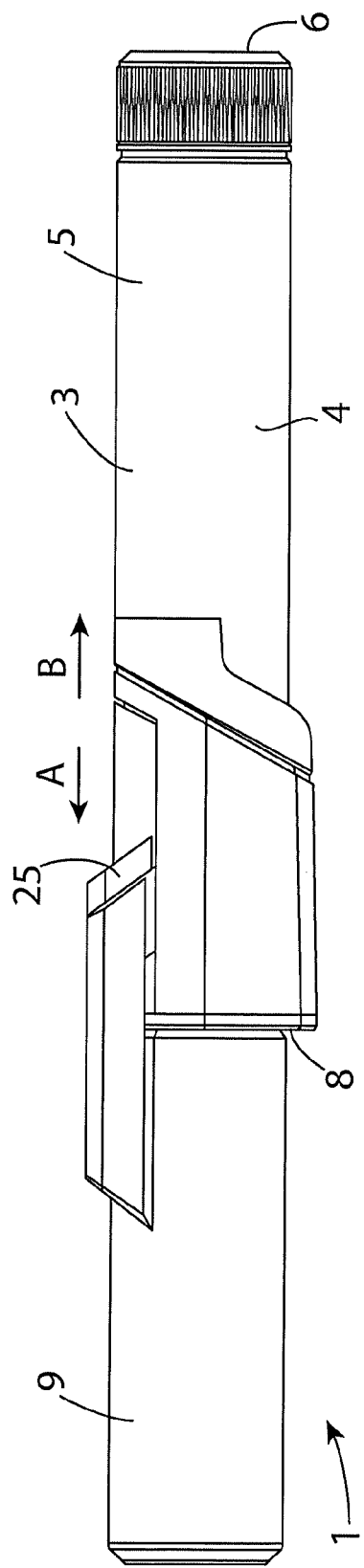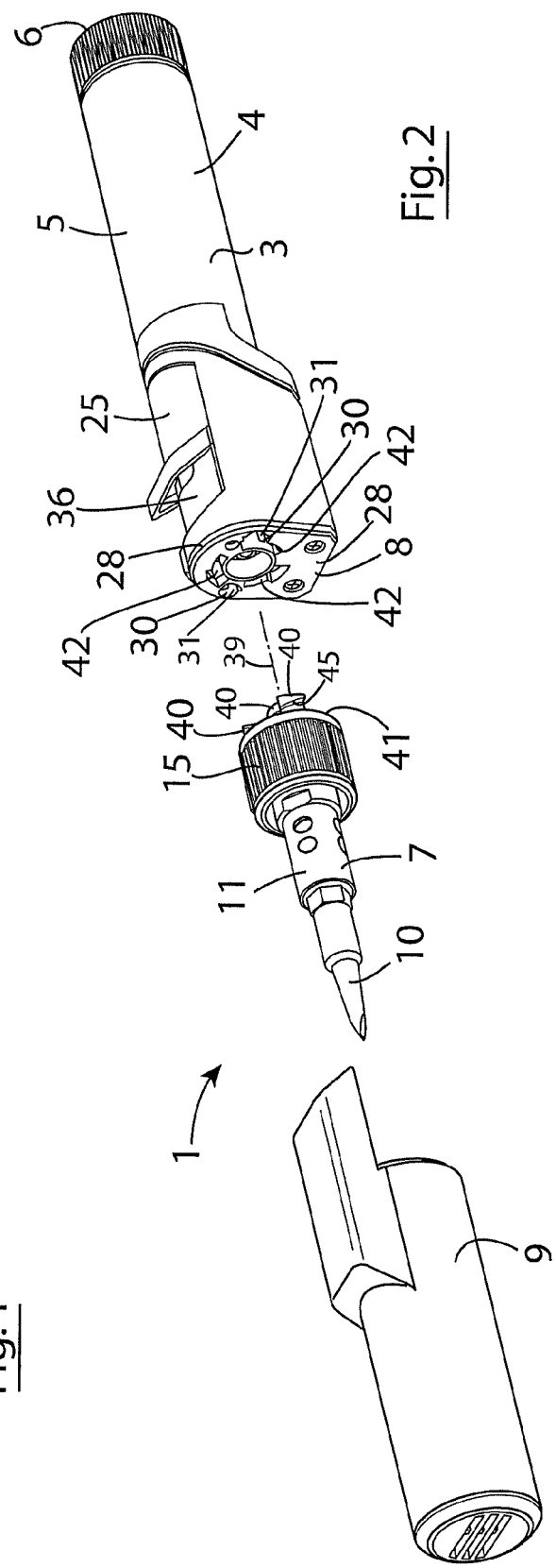

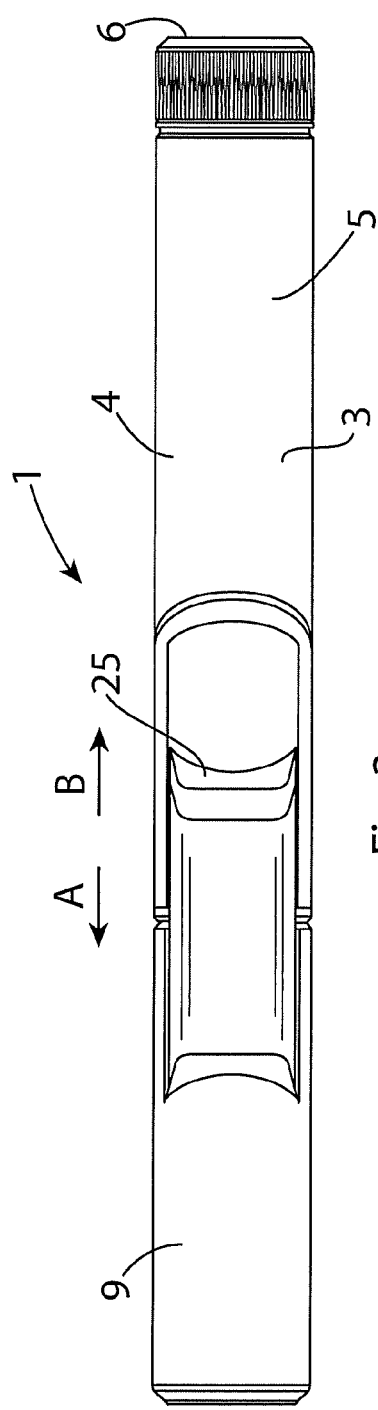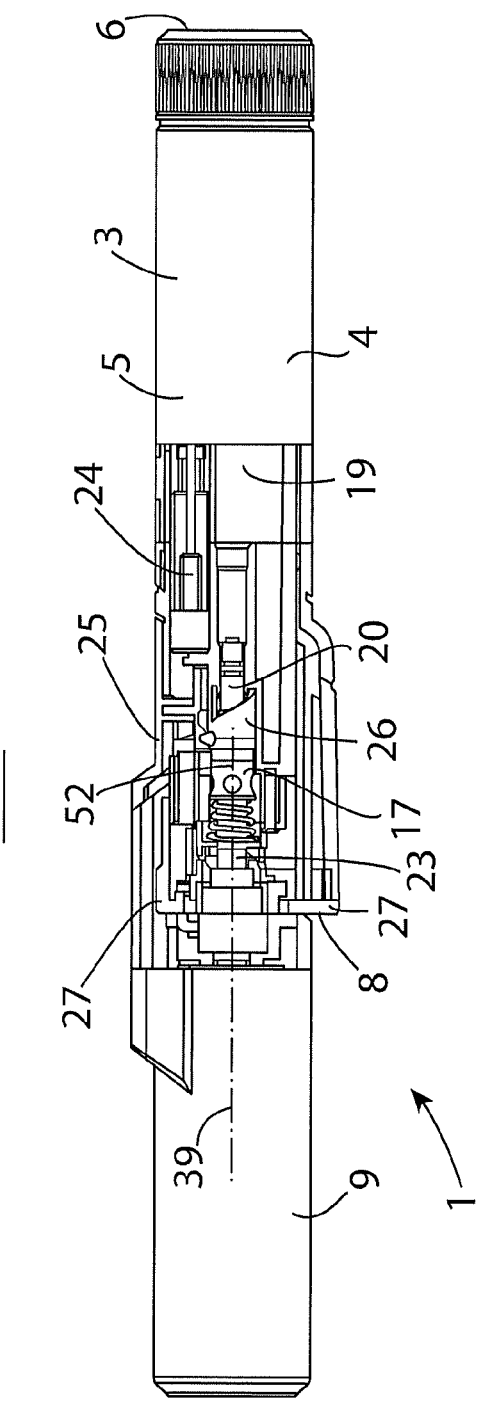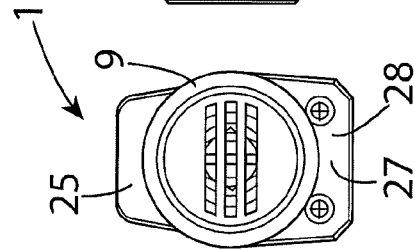

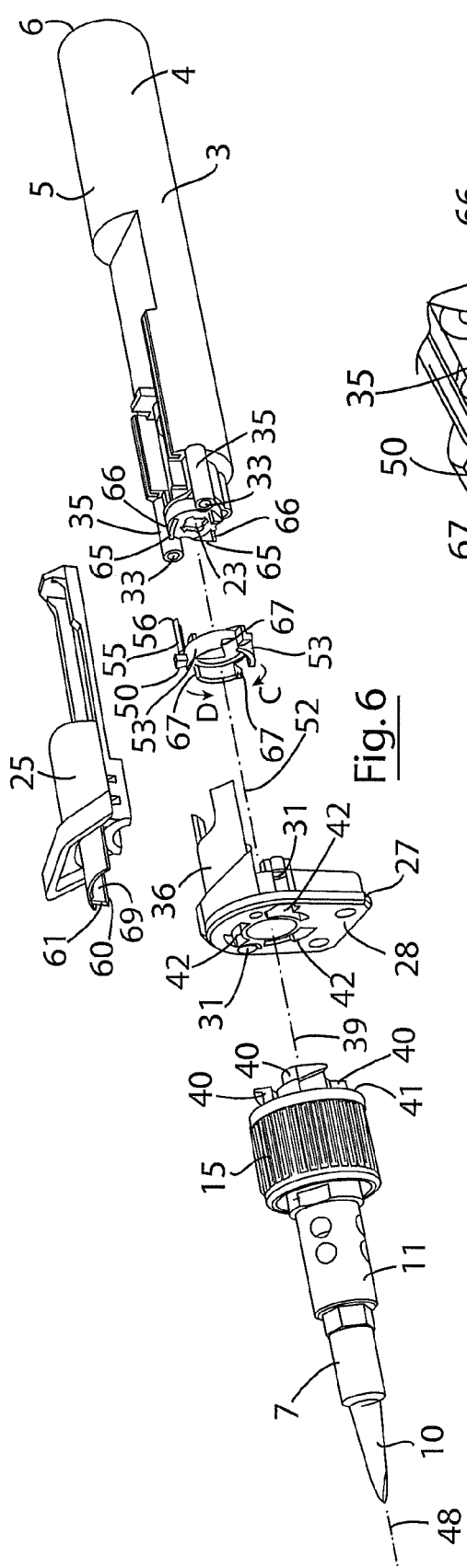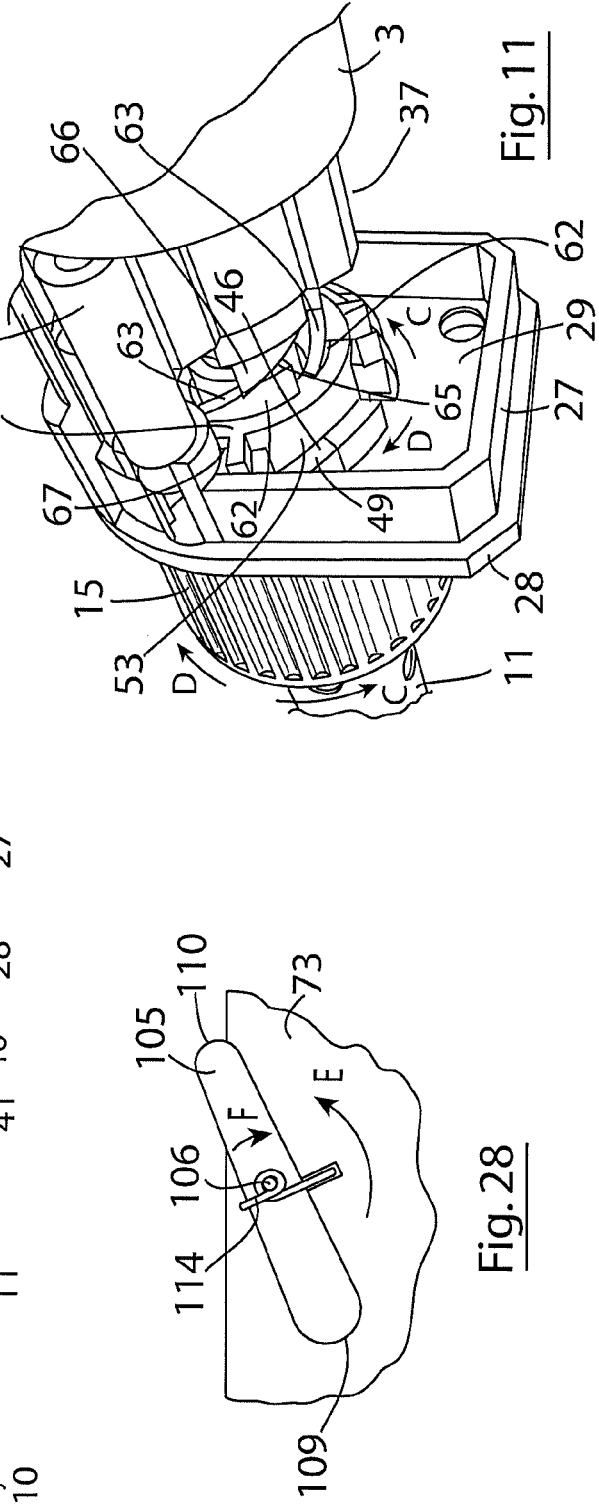

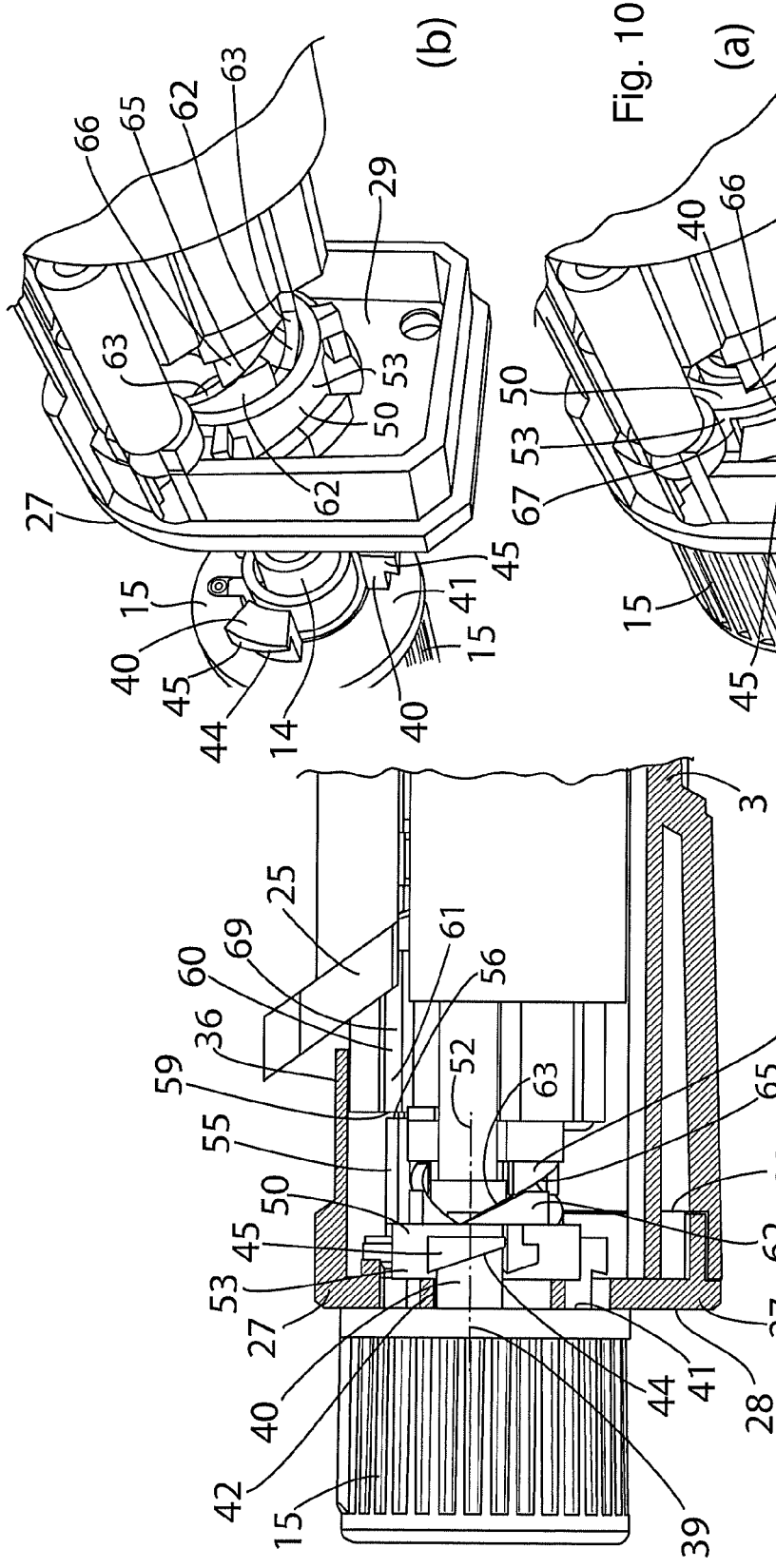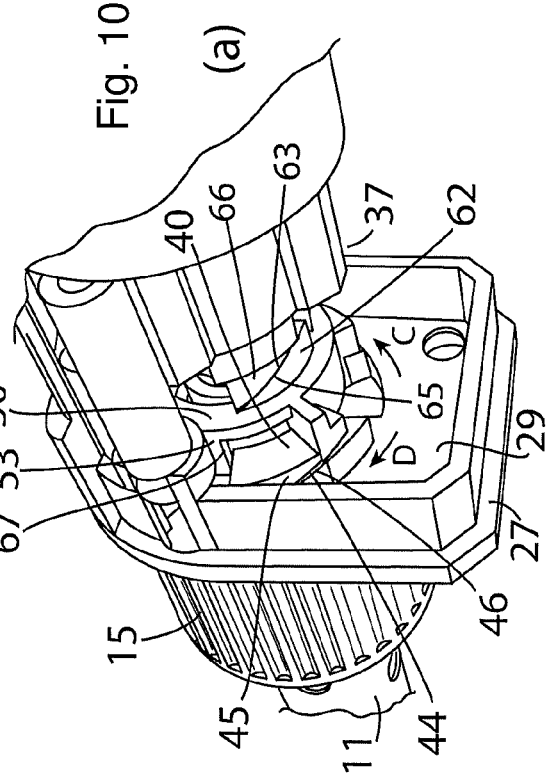

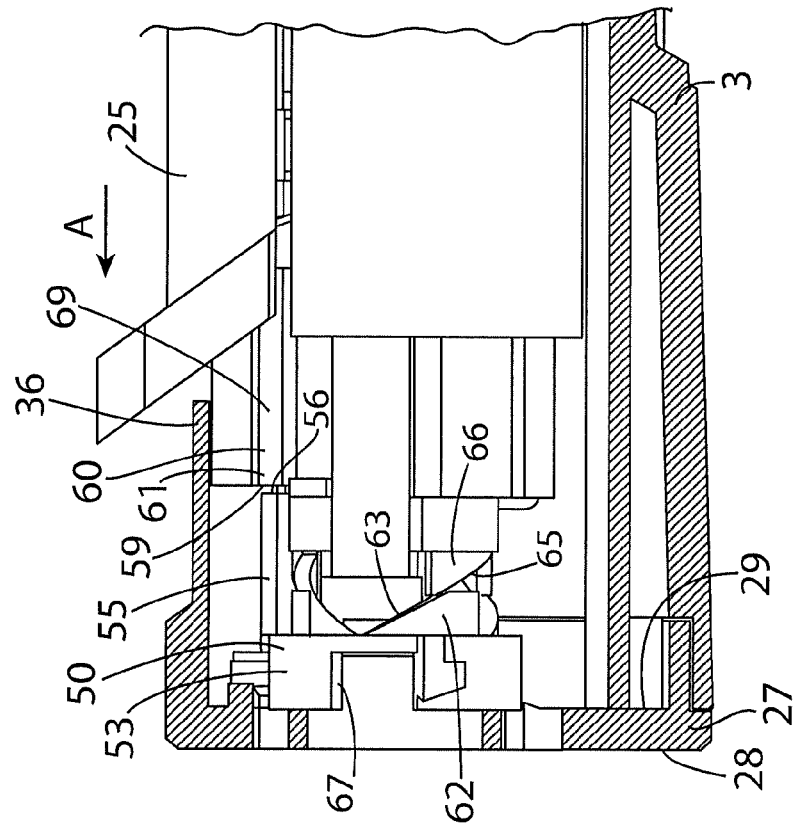
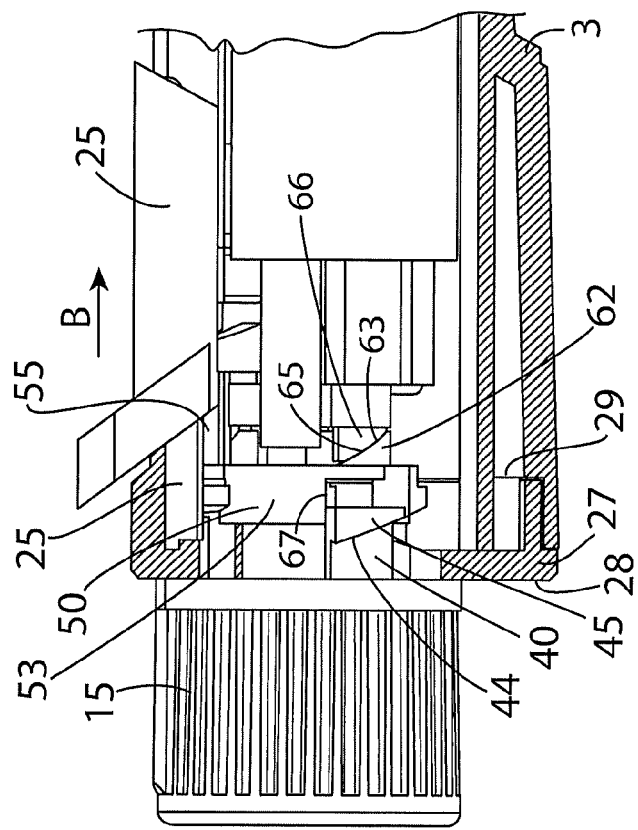
Fig.8
Fig.9

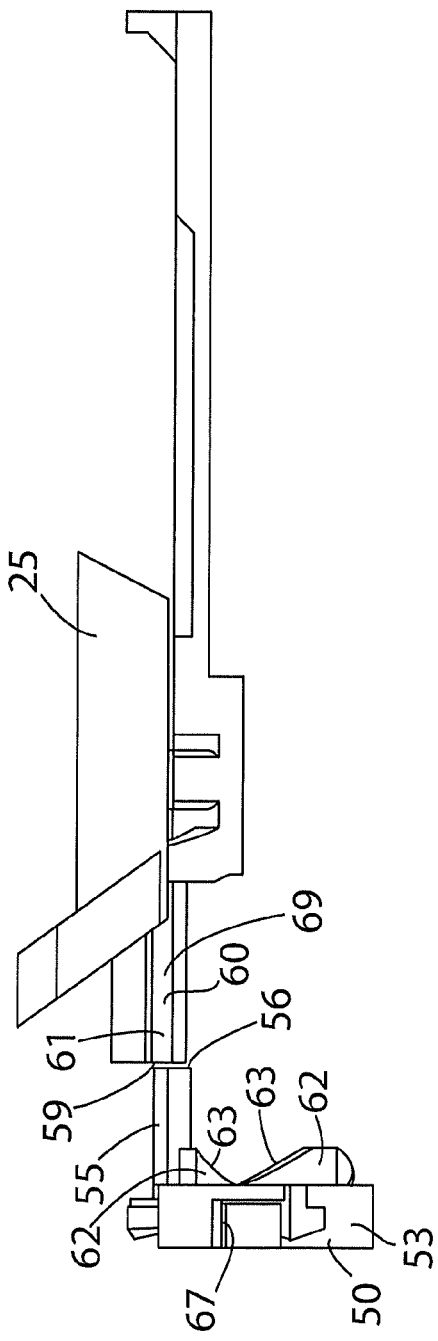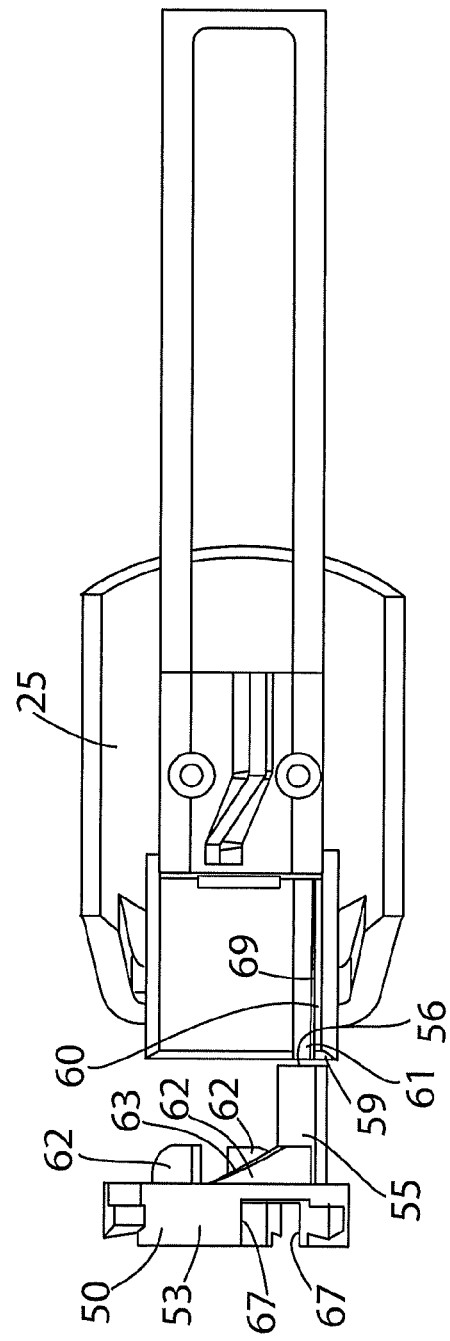

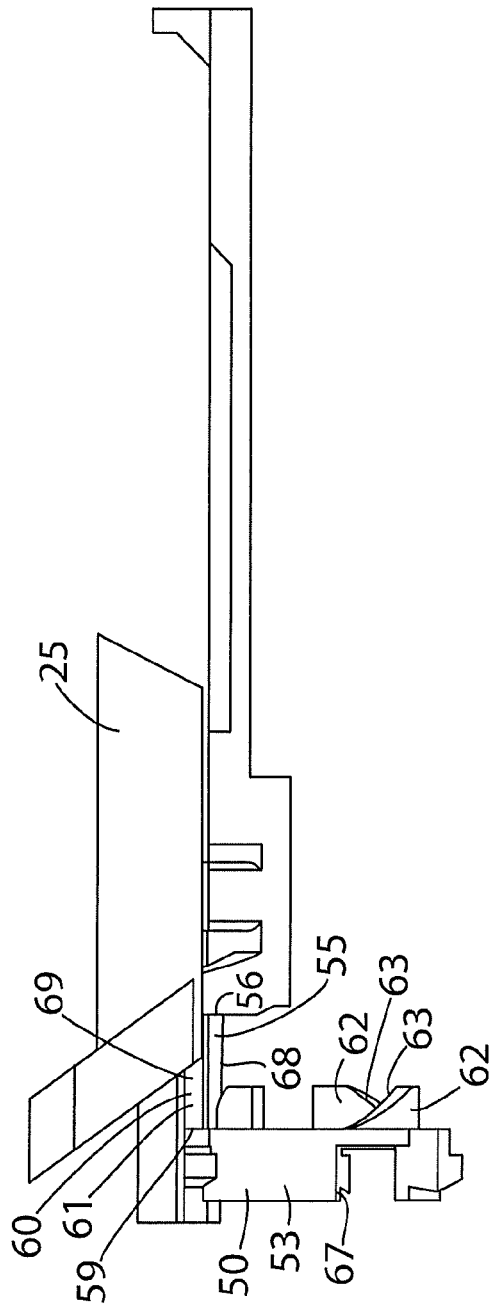

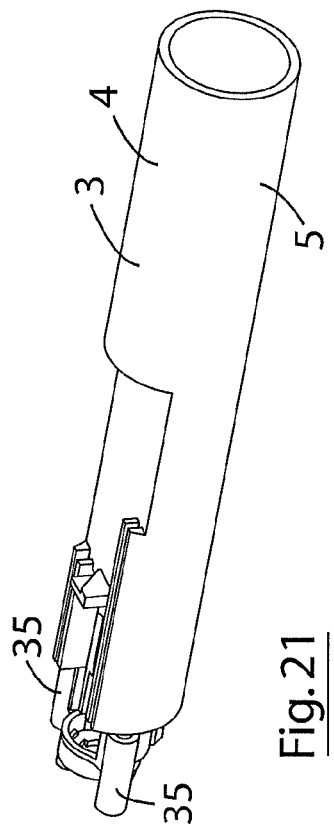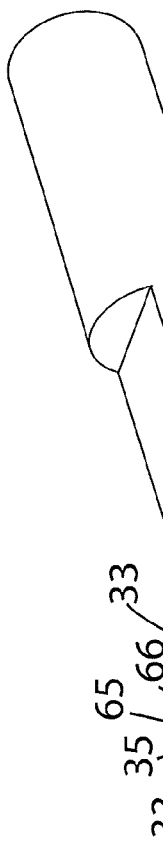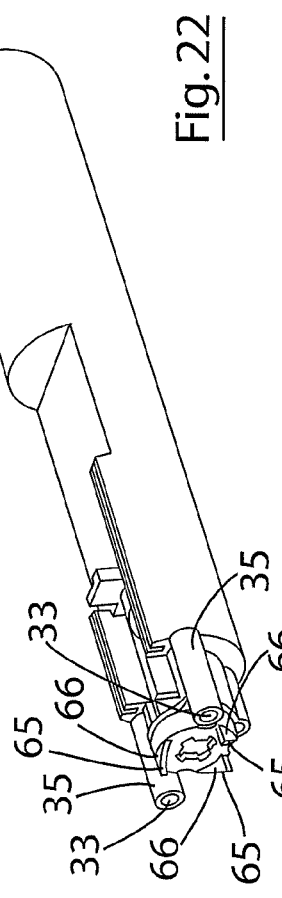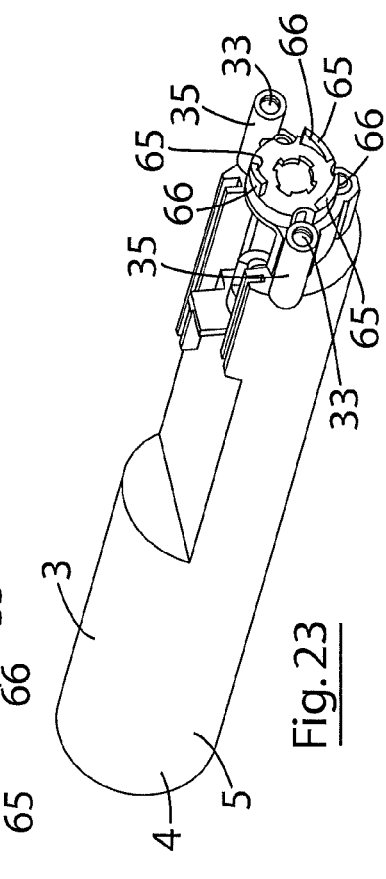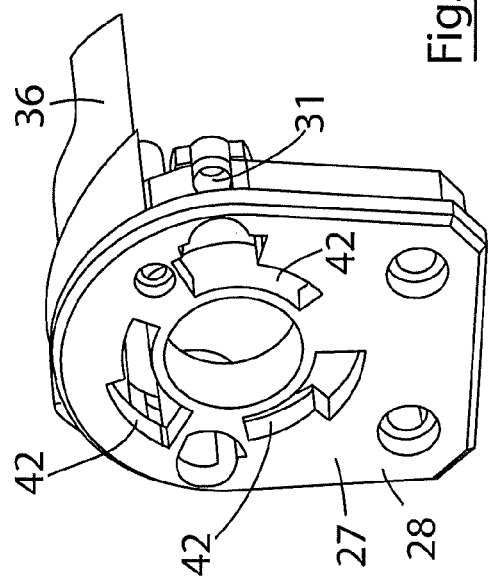

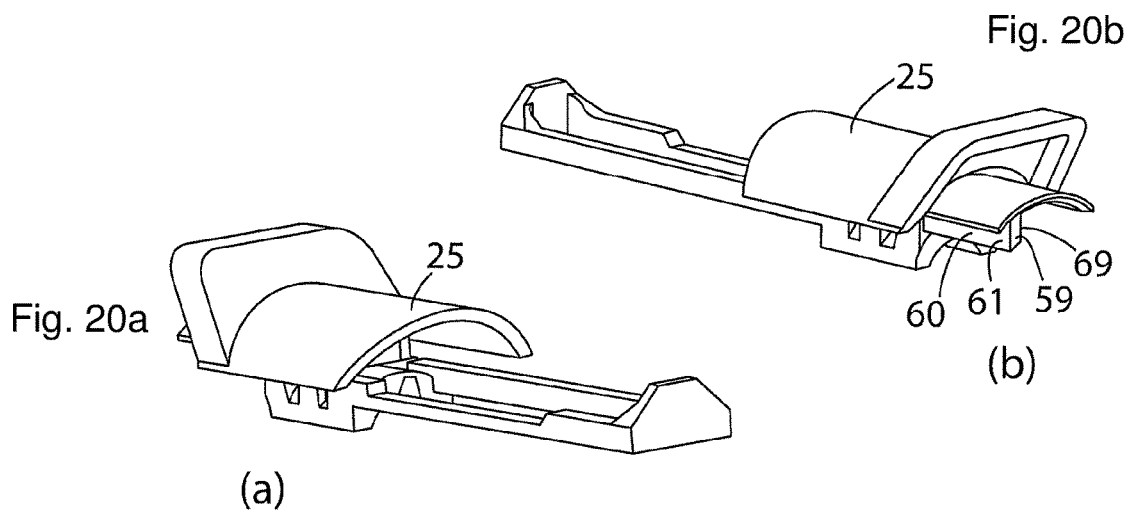
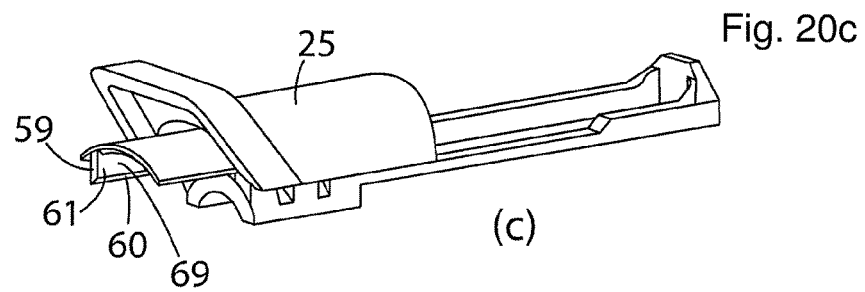
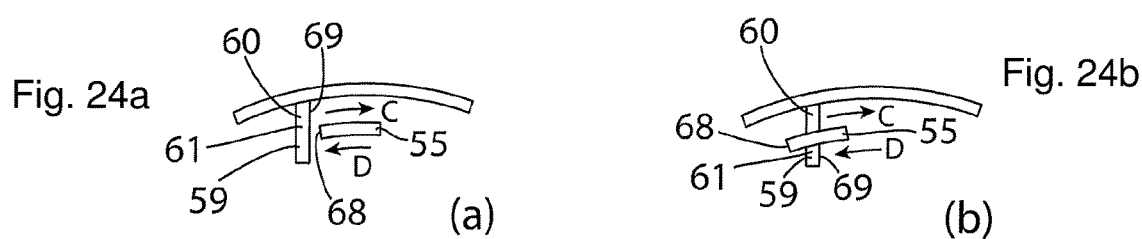
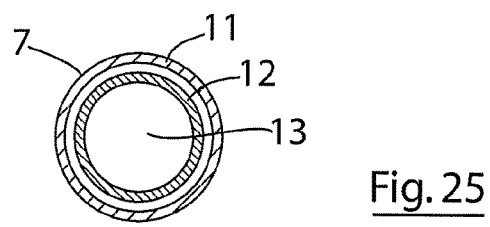

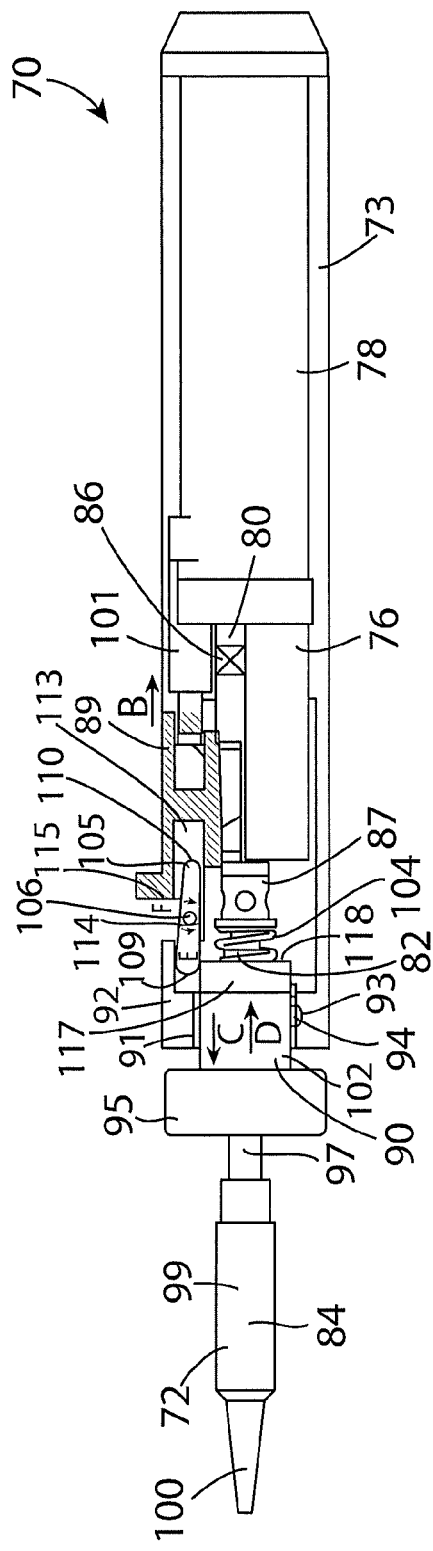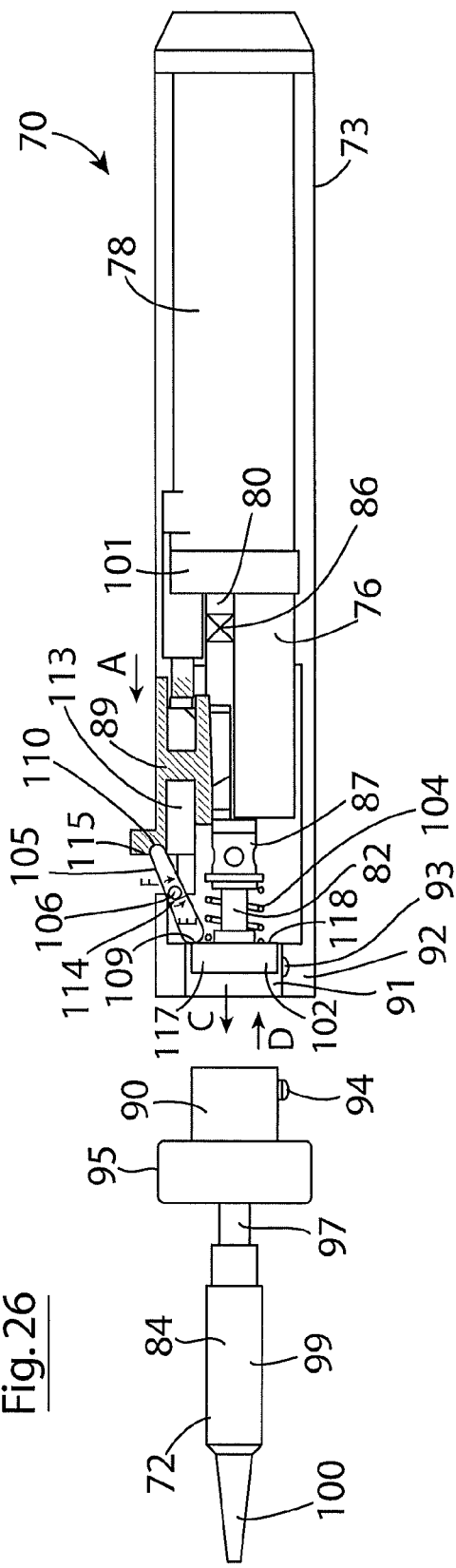
Fig. 26
Fig. 27

GAS POWERED TOOL AND A METHOD FOR RETAINING AN ISOLATING VALVE OF A GAS POWERED TOOL IN AN ISOLATING STATE

CROSS REFERENCE TO RELATED APPLICATIONS

This application is a National Stage of International Application No. PCT/IE2018/000006 filed May 8, 2018, claiming priority based on Irish Patent Application Nos. S2017/0099 filed May 5, 2017 and S2017/0163 filed Aug. 14, 2017.

The present invention relates to a gas powered tool, and in particular, though not limited, to a gas powered tool comprising a working tool element, for example, a soldering tool element, a blow torch element, a heated knife element, a hot air blower element, a welding tool element for welding plastics materials together, or the like. The invention also relates to a method for retaining an isolating valve of a gas powered tool in an isolating state in response to decoupling of a working tool element from the gas powered tool.

Gas powered tools, for example, gas powered soldering tools typically comprise a housing, which may be in the form of an elongated cylindrical housing, suitable for forming a handle for gripping the soldering tool. A working tool element, for example, a soldering tool element extends from the housing. Typically, a fuel gas reservoir is located in the housing, together with a fuel gas supply means which delivers a fuel gas mixture comprising fuel gas and air to a burner element for heating the working tool element. Typically, the burner element is located in the working tool element. A pressure regulator is located in the housing between the fuel gas reservoir and the fuel gas supply means for supplying the fuel gas to the fuel gas supply means at a safe working pressure. An isolating valve selectively operable between an isolating state and an open state is also located in the housing between the fuel gas reservoir and the fuel gas supply means for selectively isolating the fuel gas supply means from the fuel gas reservoir, and for supplying fuel gas to the fuel gas supply means from the fuel gas reservoir. An operating element for operating the isolating valve between the isolating state and the open state, is typically located on the housing, and is operably connected to the isolating valve, and is slideable between a first state corresponding to the isolating state of the isolating valve, and a second state corresponding to the open state of the isolating valve for operating the isolating valve between the isolating state and the open state.

As well as operating the isolating valve, the operating element may also be configured for operating a piezoelectric ignitor for providing an ignition spark in the burner element of the working tool element for initially igniting the mixture of fuel gas and air to burn with a flame. The piezoelectric ignitor is generally located in the housing, and is operated by the operating element as the operating element is approaching the second state on being operated from the first state thereof, and after the isolating valve has been operated into the open state. Typically, the burner element comprises a gas catalytic combustion element for converting fuel gas to heat. After the gas catalytic combustion element has been raised to its ignition temperature by the initial flame combustion the flame is extinguished and the gas catalytic combustion element continues to convert fuel gas to heat for heating the working tool element. In the majority of cases, for convenience, and in particular in cases where the working tool element comprises a soldering tool element, in order to ensure that the soldering tool element operates efficiently with minimum heat lost, the burner element is located in the soldering tool element with a soldering bit extending from the soldering tool element beyond the burner. The burner element comprises a combustion chamber and the gas catalytic combustion element is located in the combustion chamber which is integrally formed in the soldering tool element, and the soldering bit extends directly from the combustion chamber.

Such gas powered soldering tools, in general, are provided with a range of soldering tool elements of different soldering bit sizes which are suitable for soldering in different applications. Additionally, the working tool elements of such gas powered tools may be provided with a working tool in the form of a blow torch element, which acts as a blow torch with the gas being burned in a flame. Other working tool elements which may be provided for use with such gas powered tools, are for example, a heated knife of the type which typically is used for cutting plastics and other thermo-plastic type materials, and also for cutting ropes of plastics material, such as ropes formed from polypropylene fibres and the like, so that as the knife cuts through the rope, it also melts the tips of the fibres thus fusing the fibres together in order to avoid unravelling of the cut rope.

A problem with such gas powered tools is that, in general, when the gas powered tool is not in use, the working tool elements are removed from the gas powered tool. Without a tool element in place, if the isolating valve isolating the fuel gas reservoir from the fuel gas supply means is inadvertently operated from the isolating state into the open state, fuel gas can issue forth through the fuel gas supply means unimpeded due to the absence of the working tool element and the burner element, which in the presence of a naked flame can ignite with, in certain cases, fatal consequences. A further problem with such gas powered tools is that during replacement of one working tool element with an alternative working tool element, the fuel gas isolating valve may also be inadvertently operated from the isolating state into the open state, or inadvertently may not have been operated into the isolating state, thus resulting in the fuel gas being delivered unimpeded through the fuel gas delivery means, and likewise in the presence of a naked flame resulting in ignition of the fuel gas with potentially fatal consequences.

There is therefore a need for a gas powered tool which addresses this problem, and there is also a need for a method for addressing the problem.

The present invention is directed towards providing a gas powered tool which addresses the problem, and the invention is also directed towards providing a method for retaining an isolating valve of a gas powered tool in an isolating state in response to decoupling of a working tool element from the gas powered tool.

According to the invention there is provided a gas powered tool comprising a housing, a fuel gas supply means located in the housing, an isolating valve located in the housing, the isolating valve being selectively operable between an isolating state isolating the fuel gas supply means from a fuel gas source and an open state communicating the fuel gas supply means with the fuel gas source, a working tool element comprising a burner element, the working tool element being releasably coupleable to the housing with the burner element communicating with the fuel gas supply means, and a latching element responsive to decoupling of the working tool element from the housing for retaining the isolating valve in the isolating state.

Preferably, the latching element is operable into a latching state in response to decoupling of the working tool element from the housing for retaining the isolating valve in the isolating state. Advantageously, the latching element is operable from the latching state to a non-latching state permitting operation of the isolating valve between the isolating state and the open state. Ideally, the latching element is operable into the latching state from the non-latching state in response to decoupling of the working tool element from the housing.

In one aspect of the invention the latching element is manually operable from the latching state to the non-latching state.

In another aspect of the invention the latching element is operable from the latching state to the non-latching state in response to coupling of the working tool element to the housing. Preferably, the latching element is urged from the latching state to the non-latching state by the working tool element being coupled to the housing.

In another aspect of the invention the latching element is configured to be retained in the non-latching state by the working tool element being coupled to the housing.

In another aspect of the invention the latching element is engageable with the working tool element when the working tool element is coupled to the housing for retaining the latching element in the non-latching state.

Preferably, the latching element is configured to prevent decoupling of the working tool element from the housing when the isolating valve is in the open state.

In one aspect of the invention an operating element operable between a first state and a second state is co-operable with the isolating valve for operating the isolating valve from the isolating state to the open state in response to the operating element being urged from the first state to the second state. Advantageously, the latching element is co-operable with the operating element for retaining the operating element in the first state when the latching element is in the latching state. Ideally, the latching element is engageable with the operating element in the first state when the latching element is in the latching state for retaining the operating element in the first state.

Preferably, the latching element is co-operable with the working tool element and the operating element for preventing decoupling of the working tool element from the housing until the operating element is in the first state.

Advantageously, the latching element is engageable with the operating element in the second state when the latching element is in the non-latching state for preventing decoupling of the working tool element from the housing.

In one aspect of the invention the latching element is pivotal between the latching state and the non-latching state. Preferably, the latching element is pivotally coupled to the housing.

In another aspect of the invention the latching element is rotatable about a latching rotational axis between the latching state and the non-latching state. Preferably, the latching element is rotatably mounted in the housing about the latching rotational axis.

In one aspect of the invention the latching element is biased into the latching state.

In another aspect of the invention the latching element is spring urged into the latching state.

In a further aspect of the invention a camming means is provided for urging the latching element into the latching state.

In one aspect of the invention the latching element is rotatable about the latching rotational axis from the non-latching state to the latching state in response to the decoupling action of the working tool element as the working tool element is being decoupled from the housing.

Preferably, the latching element is rotatable about the latching rotational axis from the latching state to the non-latching state in response to the coupling action of the working tool element as the working tool element is being coupled to the housing.

In one aspect of the invention the working tool element is releasably coupleable to the housing by a coupling mechanism rotatable about a coupling rotational axis.

In another aspect of the invention the latching element is urgeable between the latching state and the non-latching state in response to rotation of the coupling mechanism about the coupling rotational axis.

In another aspect of the invention the latching element is urgeable from the non-latching state to the latching state in response to rotation of the coupling mechanism of the working tool element about the coupling rotational axis during decoupling of the working tool element from the housing.

In a further aspect of the invention the latching element is urgeable from the latching state to the non-latching state in response to rotation of the coupling mechanism of the working tool element about the coupling rotational axis during coupling of the working tool element to the housing.

Preferably, the coupling mechanism is secured to the working tool element.

In one aspect of the invention the coupling rotational axis about which the coupling mechanism is rotatable substantially coincides with the latching rotational axis about which the latching element is rotatable.

In another aspect of the invention the working tool element comprises an engagement member engageable with the latching element, the engagement member being configured for urging the latching element between the latching state and the non-latching state in response to rotation of the coupling mechanism about the coupling rotational axis.

Preferably, a retaining means is provided for releasably retaining the working tool element coupled to the housing.

In one aspect of the invention the retaining means comprises at least two bayonet connectors extending from the coupling mechanism for engaging the housing for retaining the working tool element coupled to the housing. Preferably, the retaining means comprises three bayonet connectors. Advantageously, the bayonet connectors of the working tool element are equi-spaced apart circumferentially around the coupling rotational axis about which the coupling mechanism is rotatable.

In one aspect of the invention at least one of the bayonet connectors is configured to form the engagement member of the working tool element for engaging the latching element.

In another aspect of the invention the latching element comprises at least one engagement recess engageable with a corresponding one of the bayonet connectors of the working tool element.

In one aspect of the invention each bayonet connector of the working tool element is configured to form a corresponding engagement member.

Preferably, the latching element comprises one engagement recess corresponding to each one of the bayonet connectors of the working tool element.

Advantageously, the engagement recesses are equi-spaced apart circumferentially around the rotational axis of the latching element.

In another aspect of the invention at least two bayonet slots are located in the housing corresponding to the respective bayonet connectors of the working tool element for releasably engaging the corresponding bayonet connectors. Preferably, the bayonet connectors extend through the corresponding bayonet slots for engaging the latching element. Advantageously, each bayonet connector is configured to engage a corresponding land in the housing.

In one aspect of the invention at least one of the bayonet connectors and the lands define a camming surface co-operable with the corresponding other one of the bayonet connectors and the lands for urging the working tool element into tight abutting engagement with the housing.

In another aspect of the invention the operating element is slideably mounted on the housing, and is slideable between the first state and the second state.

In a further aspect of the invention the latching element comprises a latching member extending from the latching element engageable with the operating element in the first state of the operating element for retaining the operating element in the first state.

Preferably, the latching member of the latching element is configured for engaging the operating element when the operating element is in the second state and the latching element is in the non-latching state, in response to decoupling of the working tool element for preventing decoupling of the working tool element from the housing when the operating element is in the second state.

In one aspect of the invention the housing comprises an elongated tubular housing having an end cap at one end thereof, and the working tool element is releasably couple-able to the end cap. Preferably, the latching element is rotatably mounted in the end cap about the latching rotational axis.

In one aspect of the invention the working tool element comprises one of a soldering tool element, a heated knife element, a blow torch element, a hot air blower element and a welding tool element for welding plastics materials together.

In another aspect of the invention the housing is configured to form a handle for holding the gas powered tool.

The invention also provides a method for retaining an isolating valve of a gas powered tool in an isolating state isolating a fuel gas supply means from a fuel gas source in response to decoupling of a working tool element from the gas powered tool, the method comprising operating a latching element for retaining the isolating valve in the isolating state in response to decoupling of the working tool element from the gas powered tool.

Preferably, the latching element is operated into a latching state in response to decoupling of the working tool element from the housing for retaining the isolating valve in the isolating state. Advantageously, the latching element is operated from the latching state to a non-latching state permitting operation of the isolating valve between the isolating state and the open state. Ideally, the latching element is operated into the latching state from the non-latching state in response to decoupling of the working tool element from the housing.

In one aspect of the invention the latching element is manually operated from the latching state to the non-latching state.

In another aspect of the invention the latching element is operated into the non-latching state from the latching state in response to coupling of the working tool element to the housing.

Preferably, the latching element is urged into the non-latching state from the latching state by the working tool element being coupled to the housing.

In one aspect of the invention the latching element is retained in the non-latching state by the working tool element coupled to the housing.

In another aspect of the invention the latching element is engaged with the working tool element when the working tool element is coupled to the housing for retaining the latching element in the non-latching state.

Preferably, the latching element prevents decoupling of the working tool element from the housing when the isolating valve is in the open state.

In one aspect of the invention an operating element is operable between a first state and a second state, and the isolating valve is urged from the isolating state to an open state in response to the operating element being urged from the first state to the second state.

In another aspect of the invention the latching element retains the operating element in the first state when the latching element is in the latching state.

Preferably, the latching element engages the operating element in the first state when the latching element is in the latching state for retaining the operating element in the first state.

Advantageously, the latching element cooperates with the working tool element and with the operating element for preventing decoupling of the working tool element from the housing until the operating element is in the first state.

In one aspect of the invention the latching element engages with the operating element in the second state when the latching element is in the non-latching state if the working tool element is urged to decouple the working tool element from the housing for preventing decoupling of the working tool element from the housing when the operating element is in the second state.

The advantages of the invention are many. A particularly important advantage of the invention is that the isolating valve which isolates the fuel gas reservoir or other fuel gas source from the remainder of the gas powered tool is retained in the isolating state while the working tool element is decoupled from the housing of the gas powered tool, thereby avoiding any danger of inadvertent ignition of the fuel gas while the working tool element is decoupled from the gas powered tool.

A further advantage of the invention is achieved when the latching element is co-operable with both the working tool element and the operating element for operating the isolating valve for preventing decoupling of the working tool element from the gas powered tool when the operating element is in the second state. This, thus, prevents the working tool element being decoupled from the housing of the gas powered tool until the operating element is urged into the first state, thereby preventing decoupling of the working tool element from the gas powered tool until the isolating valve is in the isolating state.

Figure 17A:
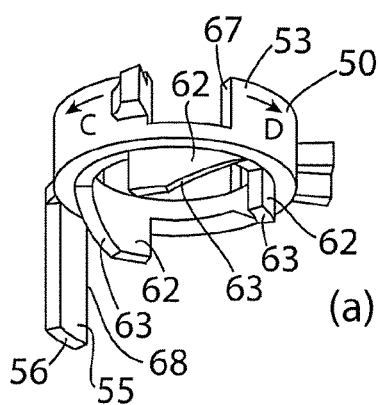
Figure 16B:
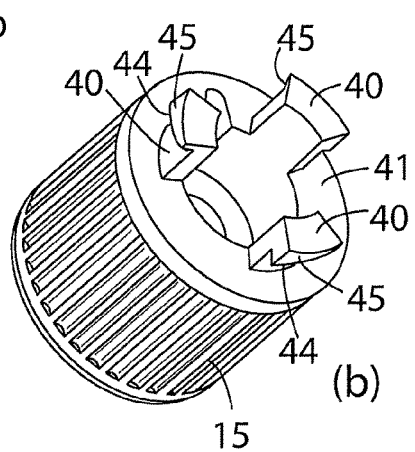
Figure 17B:
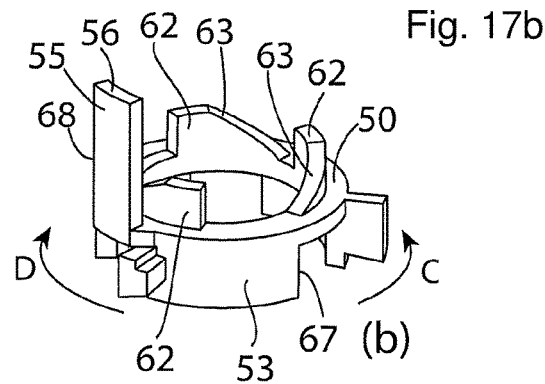
Figure 16C:
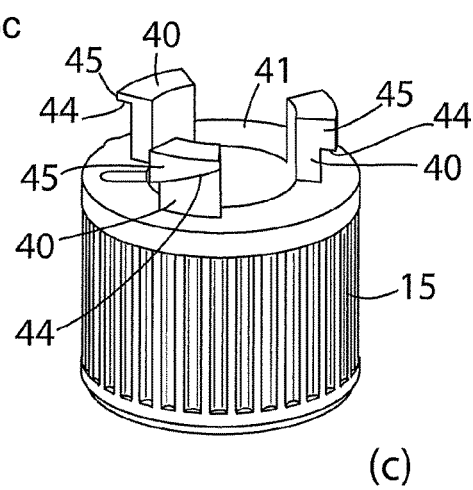
Figure 17C:
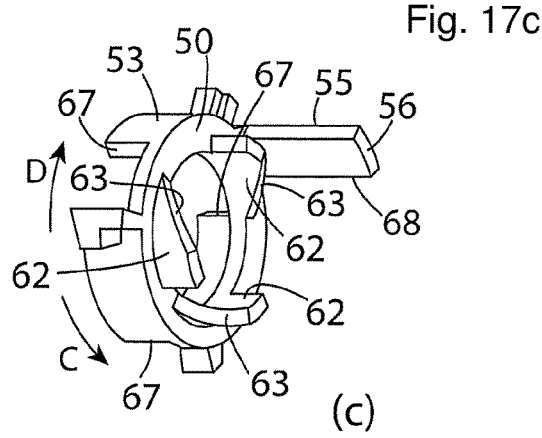

The invention will be more clearly understood from the following description of some preferred embodiments thereof which are given by way of example only with reference to the accompanying drawings, in which:

FIG. 1 is a side elevational view of a gas powered soldering tool according to the invention, FIG. 2 is an exploded perspective view of the soldering tool of FIG. 1, FIG. 3 is a top plan view of the soldering tool of FIG. 1, FIG. 4 is a partly sectional side elevational view of the soldering tool of FIG. 1, FIG. 5 is an end view of the soldering tool of FIG. 1, FIG. 6 is an exploded perspective view of a portion of the soldering tool of FIG. 1, FIG. 7 is a cross-sectional side elevational view of a portion of the soldering tool of FIG. 1, FIG. 8 is a cross-sectional side elevational view of the portion of FIG. 7 of the soldering tool of FIG. 1 with a portion removed, FIG. 9 is a cross-sectional side elevational view of the portion of FIG. 7 of the soldering tool of FIG. 1 illustrating a detail of the soldering tool of FIG. 1 in a different state to that of FIGS. 7 and 8, FIG. 10a is an underneath perspective view of the portion of FIG. 7, FIG. 10b is a partly exploded underneath perspective view of the portion of FIG. 7, FIG. 11 is a view similar to FIG. 10a but with a portion of the soldering tool in a different state to that of FIG. 10a, FIG. 12 is a side elevational view of two portions of the soldering tool of FIG. 1, FIG. 13 is an underneath plan view of the two portions of FIG. 12 of the soldering tool of FIG. 1 in the same state as that of FIG. 12, FIGS. 14 and 15 are views similar to FIGS. 12 and 13 of the two portions illustrated in FIGS. 12 and 13 of the soldering tool of FIG. 1 in a different state to that of FIGS. 12 and 13, FIGS. 16a to 16c are perspective views of another portion of the soldering tool of FIG. 1, FIGS. 17a to 17c are perspective views of a further portion of the soldering tool of FIG. 1, FIGS. 18 and 19 are perspective views of another portion of the soldering tool of FIG. 1, FIGS. 20a to 20c are perspective views of another portion of the soldering tool of FIG. 1, FIGS. 21 to 23 are perspective views of a further portion of the soldering tool of FIG. 1, FIGS. 24a and 24b are end elevational views of details of the soldering tool of FIG. 1 in respective different states, FIG. 25 is a cross-sectional end elevational view of another detail of the soldering tool of FIG. 1, FIG. 26 is a cross-sectional side elevational view of a gas powered soldering tool according to another embodiment of the invention, FIG. 27 is a view similar to FIG. 26 of the soldering tool of FIG. 26 in a different state to that of FIG. 26, and FIG. 28 is a side elevational view of a detail of the gas powered soldering tool of FIG. 26.

Referring to the drawings and initially to FIG. 1 to 25 thereof, there is illustrated a gas powered tool, which in this embodiment of the invention is configured as a gas powered soldering tool indicated generally by the reference numeral 1. The gas powered soldering tool 1 comprises a housing 3 formed by an elongated tubular element 4 extending from a rear end 6 to a front end 8, and forming a handle 5 of the gas powered soldering tool 1. A working tool element, in this embodiment of the invention a soldering tool element 7 extends from the front end 8 of the housing 3. A closure cap 9 engageable with the housing 3 adjacent the front end 8 protects the soldering tool element 7 when not in use.

The soldering tool element 7 comprises a soldering bit 10 extending from a burner element 11 defining a combustion chamber 13 within which a gas catalytic combustion element 12 is located for converting fuel gas to heat, to in turn heat the soldering bit 10. A tubular member 14 extending from the burner element 11 accommodates a mixture of fuel gas and air into the burner element 11 which is converted to heat by a catalytic action in the gas catalytic combustion element 12. A coupling mechanism for releasably coupling the soldering tool element 7 to the housing 3 comprises a coupling member 15 which is rigidly mounted on the tubular member 14 and is configured as will be described below for coupling the soldering tool element 7 to the housing 3 as will be described below.

Returning to the housing 3, a fuel gas source, in this embodiment of the invention comprising a fuel gas reservoir 19 is located in the tubular element 4 adjacent the rear end 6 thereof for storing the fuel gas in liquid form. Fuel gas is supplied from the reservoir 19 to a pressure regulator (not shown) located in the tubular element 4 adjacent the reservoir 19 for reducing the pressure of the fuel gas from the reservoir 19 to a suitable working pressure. The fuel gas is supplied from the pressure regulator (not shown) through an isolating valve 20 also located in the tubular member 4 of the housing 3 to a fuel gas supply means, which in this embodiment of the invention comprises a fuel gas supply system 23 located in the tubular element 4 of the housing 3. A venturi mixer 17 located in the fuel gas supply system 23 mixes the fuel gas with air for supplying to the combustion chamber 13 of the burner element 11 through the tubular member 14 of the soldering tool element 7. The isolating valve 20 is operable between an isolating state isolating the fuel gas supply system 23 from the fuel gas reservoir 19, and an open state communicating the fuel gas supply system 23 with the reservoir 19 for supplying fuel gas from the reservoir 19 through the fuel gas supply system 23 to the combustion chamber 13 of the burner element 11.

An operating element in this embodiment of the invention comprising a switching element 25 is slideably mounted in the tubular element 4 of the housing 3, and is operably connected through a camming system 26 to the isolating valve 20 for in turn operating the isolating valve 20 between the isolating state and open state. The switching element 25 is slideable in a longitudinal direction in the tubular element 4, and is slideable in the direction of the arrow A from a first state, illustrated in FIG. 8 with the isolating valve 20 held in the isolating state, to a second state illustrated in FIG. 9 with isolating valve 20 operated into the open state. The switching element 25 is slideable in the direction of the arrow B from the second state to the first state for operating the isolating valve 20 from the open state to the isolating state. A piezoelectric ignitor 24, see FIG. 4, is located in the tubular element 4, and is operable by the switching element 25 as the switching element 25 is approaching the second state for generating an electrical voltage pulse. The electrical voltage pulse is applied to an electrode (not shown) in the burner element 11 in order to initially ignite the fuel gas/air mixture to burn with a flame to rise the gas catalytic combustion element 12 in the burner element 11 to its ignition temperature.

The operation of the gas supply system 23 of the gas powered tool 1 will be well known to those skilled in the art, and such gas powered tools are disclosed in the applicants corresponding Patent Applications, namely, European Patent Application Specification No. 0,118,282 of Oglesby, U.S. Pat. No. 5,771,881 of Oglesby, and PCT Specification No. WO 97/38265 of Oglesby, and further explanation of the fuel gas supply system for supplying fuel from the fuel gas reservoir to the burner element 11 of the soldering tool element 7 should not be required.

Turning now to the coupling of the soldering tool element 7 to the housing 3, the tubular element 4 terminates at the front end 8 in an end cap 27 to which the soldering tool element 7 is releasably coupleable. The end cap 27 defines a front face 28 and a rear face 29, and is secured to the tubular element 4 by screws 30 through bores 31 in the end cap 27 which engage threaded bores 33 in a pair of mounting members 35 extending forwardly from the tubular element 4. An upper panel 36 extending rearwardly from the end cap 27 closes an open portion of the tubular element 4 adjacent the front end 8. The end cap 27 defines with the tubular element 4 adjacent a lower portion thereof an opening 37 for accommodating air into the venturi mixer 17 of the fuel supply system 23.

The soldering tool element 7 defines a longitudinally extending central geometrical coupling rotational axis 39 about which the soldering tool element 7 and the coupling member 15 are rotatable during coupling of the soldering tool element 7 to the end cap 27. Three bayonet connectors 40 extend from a rear face 41 of the coupling member 15 of the soldering tool element 7, and are equi-spaced apart circumferentially around the coupling rotational axis 39 of the soldering tool element 7 for releasably coupling the soldering tool element 7 to the end cap 27. The bayonet connectors 40 are engageable with three corresponding arcuate bayonet slots 42 located in the end cap 27 and extending through the end cap 27 from the front face 28 to the rear face 29 thereof. The bayonet slots 42 are correspondingly equi-spaced apart in the end cap 27 circumferentially around an axis extending through the end cap 27, which coincides with the coupling rotational axis 39 when the soldering tool element 7 is coupled to and is being coupled to the end cap 27. Sidewardly outwardly projecting camming elements 45 extend radially outwardly from the bayonet connectors 40 and define camming surfaces 44 for engaging corresponding lands 46 located on the rear face 29 of the end cap 27 for securing the soldering tool element 7 in the end cap 27. The lands 46 are located on the rear face 29 of the end cap 27 adjacent the bayonet slots 42, so that as the coupling member 15, and in turn the soldering tool element 7 is rotated in the direction of the arrow C about the coupling rotational axis 39 during coupling of the soldering tool element 7 to the end cap 27, the camming elements 45 of the bayonet connectors 40 engage the lands 46. The lands 46 define camming surfaces 49 co-operable with the corresponding camming surfaces 44 defined by the camming elements 45 of the bayonet connectors 40 for pulling the coupling member 15 into tight abutting engagement with the end cap 27 with the rear face 41 of the coupling member 15 in tight abutting engagement with the front face 28 of the end cap 27, as the coupling member 15 is rotated about the coupling rotational axis 39 during coupling of the soldering tool element 7, for in turn tightly securing the soldering tool element 7 in the end cap 27. Rotation of the coupling member 15 and the soldering tool element 7 about the coupling rotational axis 37 in the direction of the arrow D decouples the soldering tool element 7 from the end cap 27, and in turn from the housing 3.

A latching element 50 for latching the switching element 25 in the first state, and in turn for retaining the isolating valve 20 in the isolating state is rotatably mounted in the end cap 27 about a latching rotational axis 52. The latching element 50 is rotatable about the latching rotational axis 52 between a latching state illustrated in FIGS. 8, 12, 13 and 24b latching the switching element 25 in the first state, and a non-latching state illustrated in FIGS. 9, 14, 15 and 24a with the switching element 25 unlatched and free to slide between the first and second states. A latching member 55 extends rearwardly from the latching element 50 for engaging an abutment member 60 extending forwardly from the switching element 25 when the latching element 50 is in the latching state for latching the switching element 25 in the first state, as will be described in more detail below. The latching rotational axis 52 of the latching element 50 coincides with the coupling rotational axis 39 of the coupling member 15 and the soldering tool element 7 when the bayonet connectors 40 of the coupling member 15 are engaged in the bayonet slots 42 in the end cap 27.

A circular outer flange 53 extending forwardly from the latching element 50 rotatably engages a circular inner flange 54 extending rearwardly from the rear face 29 of the end cap 27 for rotatably mounting the latching element 50 in the end cap 27 about the latching rotational axis 52. The circular outer flange 53 extending from the latching element 50 is of internal diameter just greater than the external diameter of the circular inner flange 54 extending from the rear face 29 of the end cap 27, so that the outer flange 53 is rotatable on the inner flange 54 about the latching rotational axis 52.

Three engagement recesses 67 are formed in the outer flange 53 of the latching element 50, and are equi-spaced apart circumferentially around the outer flange 53 for engaging engagement members of the coupling member 15, which in this embodiment of the invention are provided by the bayonet connectors 40 of the coupling member 15 of the soldering tool element 7. The engagement recesses 67 are configured for engaging the corresponding ones of the bayonet connectors 40 when the bayonet connectors 40 extend through the bayonet slots 42 in the end cap 27, so that as the coupling member 15 of the soldering tool element 7 is rotated about the coupling rotational axis 39 in the direction of the arrow C from the decoupled state to the coupled state for coupling the soldering tool element 7 to the end cap 27, the latching element 50 is urged about the latching rotational axis 52 thereof also in the direction of the arrow C from the latching state to the non-latching state. When the coupling member 15 of the soldering tool element 7 is rotated about the coupling rotational axis 39 in the direction of the arrow D from the coupled state to the decoupled state for decoupling the soldering tool element 7 from the end cap 27, the latching element 50 is urged about the latching rotational axis 52 thereof also in the direction of the arrow D from the non-latching state to the latching state.

The latching element 50 is biased into the latching state by a camming means. The camming means comprises a camming system comprising three arcuate camming elements 62 extending rearwardly from the latching element 50 and equi-spaced apart circumferentially around the latching rotational axis 52 of the latching element 50. The camming elements 62 terminate in rearwardly facing camming surfaces 63, which are co-operably engageable with three corresponding camming surfaces 65 formed on corresponding camming members 66 extending forwardly from the tubular member 4. The camming members 66 are equi-spaced apart circumferentially about the latching rotational axis 52 of the latching element 50. The camming surfaces 63 and 65 cooperate for urging the latching element 50 into the latching state and for retaining the latching element 50 in the latching state while the soldering tool element 7 is decoupled from the housing 3.

Returning now to the latching member 55 which extends rearwardly from the latching element 50, the latching member 55 terminates in a rearward distal abutment face 56 for abutting a forwardly facing abutment face 59 adjacent a forward distal end 61 of the abutment member 60 extending forwardly from the switching element 25 when the latching element 50 is in the latching state and the switching element 25 is in the first state for retaining the switching element 25 in the first state, and for in turn retaining the isolating valve 20 in the isolating state. Referring now in particular to FIGS. 12, 13 and 24b when the latching element 50 is in the latching state, the latching member 55 is in a latching state with the rearward abutment face 56 thereof abutting the forward abutment face 59 of the abutment member 60 extending from the switching element 25. When the latching element 50 is urged from the latching state to the non-latching state, the latching member 55 is urged in the direction of the arrow C from its latching state to its non-latching state, see FIG. 24a, whereby the latching member 55 lies to one side of the abutment member 60. In this embodiment of the invention the latching member 55 lies to the side of the abutment member 60 which defines a first side abutment face 69 of the abutment member 60 when the latching element 50 is in the non-latching state. Thereby, the latching member 55 is clear of the abutment member 60 of the switching element 25. This, thus, permits the switching element 25 to be operated between the first state and the second state for in turn operating the isolating valve 20 between the isolating state and the open state.

The latching member 55 defines a second side abutment face 68 which extends longitudinally along one side edge of the latching member 55. When the latching element 50 is in the non-latching state, the second side abutment face 68 of the latching member 55 lies adjacent and just clear of the first side abutment face 69 of the abutment member 60 of the switching element 25 as the switching element 25 is being urged between the first and second states. This as discussed above permits operation of the switching element 25 between the first and second states when the latching element 50 is in the non-latching state.

In this embodiment of the invention the latching member 50 cooperates with the abutment member 60 of the switching element 25 and with the coupling member 15 of the soldering tool element 7 in order to prevent decoupling of the soldering tool element 7 from the housing 3 when the switching element 25 is in the second state, so that the soldering tool element 7 is only decoupleable from the housing 3 when the switching element 25 is in the first state. This ensures that the soldering tool element 7 is only decoupleable from the housing 3 when the isolating valve 20 is in the isolating state. The engagement recesses 67 of the latching element 50 engage the bayonet connectors 40 of the coupling member 15 when the soldering tool element 7 is in the coupled state, and while the soldering tool element 7 is being rotated about the coupling rotational axis 39. The second side abutment face 68 of the latching member 55 lies along the first side abutment face 69 of the abutment member 60 of the switching element 25 when the latching element 50 is in the non-latching state and the switching element 25 is in the second state. Therefore, if an attempt is made to rotate the coupling member 15 of the soldering tool element 7 in the direction of the arrow D from the coupled state to the decoupled state to decouple the soldering tool element 7 from the end cap 27, the second side abutment face 68 of the latching member 55 is urged in the direction of the arrow D, see FIG. 24a, into engagement with the first side abutment face 69 of the abutment member 60 of the switching element 25, thereby preventing decoupling of the soldering tool element 7 until the switching element 25 has been urged from the second state to the first state. Thereby, the latching member 55, when the latching element 50 is in the non-latching state cooperates with the abutment member 60 of the switching element 25 and also cooperates with the coupling member 15 of the soldering tool element 7, when the switching element 25 is in the second state and the soldering tool element 7 is in the coupled state coupled to the housing 3, to prevent decoupling of the soldering tool element 7 from the housing 3. This, thus, prevents the soldering tool element 7 being decoupled from the housing 3 until the switching element 25 is urged into the first state with the isolating valve 20 in the isolating state.

In use, when it is desired to use the soldering tool 1, the soldering tool element 7 or other suitable working tool element 7, depending on the use to which the soldering tool 1 is to be put, is coupled to the end cap 27 of the housing 3 by engaging the bayonet connectors 40 in the bayonet slots 42 of the end cap 27. At this stage the latching element 50 is biased into the latching state with the latching member 55 latching and retaining the switching element 25 in the first state by the biasing action of the camming surfaces 63 and 65 of the camming elements 62 and 66. As the bayonet connectors 40 are being urged into the bayonet slots 42 in the end cap 27, the bayonet connectors 40 engage the corresponding ones of the engagement recesses 67 in the outer flange 53 of the latching element 50. The coupling member 15 of the soldering tool element 7 is then rotated about the coupling rotational axis 39 in the direction of the arrow C for urging the bayonet connectors 40 along the bayonet slots 42, for in turn engaging the camming elements 45 of the bayonet connectors 40 with the lands 46 in the end cap 27 in order to tightly engage the soldering tool element 7 in the end cap 27 with the rear face 41 of the coupling member 15 in tight abutting engagement with the front face 28 of the end cap 27. As the coupling member 15 of the soldering tool element 7 is being rotated about the coupling rotational axis 39 in the direction of the arrow C from the decoupled state into the coupled state, the bayonet connectors 40 rotate the latching element 50 about the latching rotational axis 52 from the latching state to the non-latching state with the latching member 55 disengaged from the abutment member 60 of the switching element 25 so that the switching element 25 is operable between the first and second states for operating the isolating valve 20 between the isolating state and the open state.

When it is desired to commence a soldering operation, the switching element 25 is urged from the first state to the second state for operating the isolating valve 20 from the isolating state to the open state, for in turn supplying the fuel gas/air mixture to the burner element 11. As the switching element 25 is approaching the second state thereof, the switching element 25 operates the piezoelectric ignitor 24 for initially igniting the fuel gas/air mixture to burn with a flame in the burner element 11. On the temperature of the gas catalytic combustion element 12 being raised to its ignition temperature by the flame combustion, the gas catalytic combustion element 12 commences to convert the fuel gas/air mixture to heat by catalytic action, and flame is subsequently starved of fuel gas and thus extinguished. The gas catalytic combustion element 12 continues to convert the fuel gas/air mixture to heat, thereby heating the tool bit 10 to carry out the soldering operation. For so long as the switching element 25 remains in the second state, the cooperating action between the latching element 50 and the coupling member 15 of the soldering tool element 7 and the cooperating action between the latching member 55 and the abutment member 60 of the switching element 25 prevents rotation of the coupling element 15 about the coupling rotational axis 39 in the direction of the arrow D, thereby preventing decoupling the soldering tool element 7 from the housing 3.

On completion of the soldering operation, the switching element 25 is operated in the direction of the arrow B from the second state to the first state for in turn operating the isolating valve 20 from the open state into the isolating state.

At this stage, with the switching element 25 in the first state, if it is desired to remove the soldering tool element 7 from the housing 3 or to replace the soldering tool element 7 with another soldering tool element or another working tool element, the coupling member 15 of the soldering tool element 7 is rotated about the coupling rotational axis 39 in the direction of the arrow D for decoupling the soldering tool element 7 from the housing 3. On rotating the coupling member 15 about the coupling rotational axis 39 in the direction of the arrow D, the latching element 50 is rotated about the latching rotational axis 52 from the non-latching state to the latching state with the latching member 55 engaging the abutment member 60 of the switching element 25 for latching the switching element 25 in the first state. The latching element 50 is retained in the latching state by the biasing action of the camming surfaces 63 and 65 of the camming elements 62 and 66. The soldering tool element 7 is then removed from the housing 3, and if desired may be replaced with another soldering tool element, or another working tool element. Coupling of the other soldering tool element or the other working tool element with the housing 3 is similar to the coupling of the soldering tool element 7 with the housing 3 as already described.

Referring now to FIGS. 26 to 28 there is illustrated a gas powered tool according to another embodiment of the invention which is configured as a gas powered soldering tool indicated generally by the reference numeral 70. The gas powered soldering tool 70 comprises a soldering tool element 72, and may also be provided with other working tool elements, such as, for example, a heated knife element, a blow torch element, a hot air blower element and/or a welding tool element for welding plastics materials together, which would be coupleable to the gas powered tool 70 instead of the soldering tool element 72.

The gas powered soldering tool 70 comprises a housing 73 of hollow cylindrical construction having a cylindrical side wall 75 defining a hollow interior region 76. The cylindrical side wall 75 forms a hand grip for holding the gas powered soldering tool 70 during use thereof. A fuel gas source, in this embodiment of the invention comprising a fuel gas reservoir 78 is located in the hollow interior region 76 of the housing 75 for storing fuel gas in liquid form. A fuel gas supply tube 80 extends from the reservoir 78 for supplying fuel gas to a fuel gas supply means, namely, a fuel gas outlet pipe 82, which in turn supplies fuel gas to a gas burner element 84 in the soldering tool element 72.

An isolating means, namely, an isolating valve 86 is located in the hollow interior region 16 of the housing 73, in the fuel gas supply tube 80, and is operable between an isolating state for isolating the fuel gas outlet pipe 82 from the fuel gas reservoir 78, and an open state through which fuel gas is supplied from the fuel gas reservoir 78 to the fuel gas outlet pipe 82. A venturi mixer 87 is located between the fuel gas supply tube 80 and the fuel gas outlet pipe 82 for mixing air with the fuel gas which in turn is delivered through the fuel gas outlet pipe 82 to the burner element 84 of the soldering tool element 72.

An operating means, in this embodiment of the invention a switching element 89 is slideably mounted in the cylindrical side wall 75 of the housing 73 and is operably connected to the isolating valve 86. The switching element 89 is slideable in a longitudinal direction along the housing 73 in the direction of the arrow A from a first state illustrated in FIG. 27 with the isolating valve 86 in the isolating state to a second state illustrated in FIG. 26 with the isolating valve 86 in the open state for supplying fuel gas therethrough from the reservoir 78 to the fuel gas outlet pipe 82. The switching element 89 is slideable in the direction of the arrow B from the second state to the first state for operating the isolating valve 86 from the open state to the isolating state.

The soldering tool element 72 together with the burner element 84 is releasably engageable in the housing 73 and comprises a cylindrical engagement element 90 releasably engageable in a receiving bore 91 in a forward end cap 92 of the housing 73. A spring loaded ball catch 94 on the engagement element 90 is engageable with a corresponding receiver 93 located in the receiving bore 91 for releasably retaining the soldering tool element 72 in the housing 73. A hand grip element 95 extends around the engagement element 90 for gripping the soldering tool element 72 for coupling and decoupling the soldering tool element 72 to and from the housing 73. A tube 97 extending from the burner element 84 through the engagement element 90 communicates with the fuel gas outlet pipe 82 when the engagement element 90 is engaged in the receiving bore 91 for supplying the fuel gas/air mixture from the fuel gas outlet pipe 82 to the burner element 84.

The burner element 84 is substantially similar to the burner element 11 of the soldering tool element 7 of the soldering tool 1 described with reference to FIGS. 1 to 25 and comprises a combustion chamber 99 within which a gas catalytic combustion element (not shown) is located for converting the fuel gas/air mixture from the venturi mixer 87 to heat. A soldering bit 100 of the soldering tool element 72 extending from the combustion chamber 99 is heated by radiation and conduction of heat as the fuel gas/air mixture is converted by the gas catalytic combustion element (not shown) to heat. Such gas powered soldering tool elements as the soldering tool element 72 with a burner element similar to the burner element 84 will be well known to those skilled in the art, and are disclosed in the prior art Patent specifications referenced above, and further description should not be required.

The switching element 89 as well as operating the isolating valve 86 also activates piezoelectric ignitor element 101 for producing an electrical voltage to an electrode (not shown) located in the combustion chamber 99 of the burner element 84 for initially converting the fuel gas/air mixture to heat by flame combustion, so that the flame rises the temperature of the gas catalytic combustion element to its ignition temperature. On being raised to its ignition temperature, the gas catalytic combustion element converts the fuel gas to heat by catalytic conversion, and thus starves the flame of fuel gas resulting in extinguishing of the flame, so that combustion of the fuel gas/air mixture continues as a result of catalytic conversion.

An abutment means in this embodiment of the invention a disc shaped abutment element 102 is slideably mounted on the fuel gas outlet pipe 82 and is configured for engagement with the engagement element 90 of the soldering tool element 72 as the soldering tool element 72 is being coupled to the housing 73 by engagement of the engagement element 90 in the receiving bore 91. The abutment element 102 is spring urged forwardly along the fuel gas outlet pipe 82 in the direction of the arrow C by a compression spring 104 acting between the abutment element 102 and the venturi mixer 87, from a first state illustrated in FIG. 26 to a second state illustrated in FIG. 27. As the soldering tool element 72 is being coupled to the housing 73 by engagement of the engagement element 90 in the receiving bore 91, the abutment element 92 is urged by the engagement element 90 against the compression spring 104 in the direction of the arrow D from the second state into the first state when the engagement element 90 is fully engaged in the receiving bore 91 and the soldering tool element 72 is in the coupled state coupled to the housing 73. The compression spring 104 urges the abutment element 102 in the direction of the arrow C from the first state to a second state when the soldering tool element 72 has been decoupled from the housing 73.

A latching element, in this embodiment of the invention, an elongated latching element 105 is pivotally mounted in the housing 73 on a pivot pin 106, and is pivotal from a non-latching state illustrated in FIG. 26 to a latching state illustrated in FIG. 27 in response to decoupling of the soldering tool element 72 from the housing 73 for latching the switching element 89 in the first state, and thus retaining the isolating valve 86 in the isolating state. The latching element 105 extends between a first engagement means, namely, a first engagement end 109, and a second engagement means, namely, a second engagement end 110. The pivot pin 106 pivotally mounts the latching element 105 on the housing 73 intermediate the first engagement end 109 and the second engagement end 110. The first engagement end 109 is engageable with a side face 117 of the abutment element 102, so that when the abutment element 102 is retained in the first state illustrated in FIG. 26 by the soldering tool element 72 in the coupled state coupled to the housing 73 the latching element 105 is retained in a non-latching state illustrated in FIG. 26 with the second engagement end 110 located in a bore 113 within the switching element 89. When the latching element 105 is in the non-latching state with the second engagement end 110 in the bore 113 in the switching element 89, the second engagement end 110 of the latching element 89 is slideable in the bore 113 for permitting operation of the switching element 89 between the first and second states for in turn operating the isolating valve between the isolating state and the open state.

The latching element 105 is spring urged about the pivot pin 106 in the direction of the arrow E by a torsion spring 114 for urging the latching element 105 into the latching state, and in turn for urging the second engagement end 110 into engagement with an abutment face 115 of the switching element 89 for latching the switching element 89 in the first state. The torsion spring 114 is located on the pivot pin 106 and acts between the housing 73 and the latching element 105. The latching element 105 is urgeable from the non-latching state into the latching state illustrated in FIG. 27 under the action of the torsion spring 114 in response to movement of the abutment element 102 from the first state to the second state, which in turn is in response to decoupling of the soldering tool element 72 from the housing 73. In the latching state illustrated in FIG. 27 the second engagement end 110 of the latching element 95 is disengaged from the bore 113 in the switching element 89 and is in abutment engagement with the abutment face 115 of the switching element 89 for retaining the switching element 89 in the first state, thereby preventing operation of the switching element 89 from the first state to the second state, and in turn retaining the isolating valve 86 in the isolating state with the fuel gas outlet pipe 82 isolated from the fuel gas reservoir 78. In the latching state of the latching element 105 the first engagement end 109 thereof engages a rearwardly facing end face 118 of the abutment element 102.

The latching element 105 is retained in the latching state by the action of the torsion spring 114, until the second engagement end 110 is manually urged in the direction of the arrow F into the non-latching state disengaged from the end face 118 of the abutment element 102, in order to permit recoupling of the soldering tool element 72 or another working tool element with the housing 73. Once the soldering tool element 72 is coupled to the housing 73 or an alternative working tool element is coupled to the housing 73, the abutment element 102 is retained in the first state by the soldering tool element 72 or the other working tool element, and thus retains the latching element 105 in the non-latching state permitting operation of the switching element 89 between the first and second states for in turn operating the isolating valve 86 between the isolating state and the open state.

Other suitable control systems which are not illustrated in the drawings are provided in the housing 73, such as a pressure regulator for reducing the pressure of the liquid gas in the fuel gas reservoir 78 to a suitable safe working pressure, and other suitable safety devices for isolating the fuel gas reservoir 78 in the event of overheating of the soldering tool element 72 or other working tool element, or indeed overheating of the housing 73. Such additional control systems will be well known to those skilled in the art, and further description should not be required.

In use, with the soldering tool element 72 coupled to the housing 73 by engaging the engagement element 90 fully in the receiving bore 91 of the end cap 92 of the housing 73 and engaging the ball catch 94 with the receiver 93, the gas powered tool 70 is ready for use. In order to operate the gas powered tool 70, the switching element 89 is urged in the direction of the arrow A from the first state to the second state for operating the isolating valve 86 from the isolating state into the open state, and also for operating the piezoelectric ignitor 91 to generate a high voltage electric pulse in order to provide an ignition spark in the combustion chamber 99. Initially the fuel gas is ignited by the ignition spark to burn in the combustion chamber 99 with flame combustion, which in turn raises the temperature of the gas catalytic combustion element to its ignition temperature, at which stage the gas catalytic combustion element commences to convert fuel gas to heat by catalytic reaction, and the flame is extinguished by starvation of fuel gas. The soldering bit 100 is raised to its operating temperature by heat radiated from the gas catalytic combustion element and conducted through the combustion chamber into the soldering bit 100.

When it is desired to replace the soldering tool element 72 with another soldering tool element, or, for example, with a blow torch element, a heated knife element, a hot air blower element or a welding tool element, none of which are illustrated, the soldering tool element 72 is gripped by the hand grip element 95 and decoupled from the housing 73. Decoupling of the soldering tool element 72 from the housing 73 results in the abutment element 102 being urged by the compression spring 104 from the first state to the second state, thus releasing the latching element 105 from the non-latching state to the latching state thereby retaining the switching element 89 in the first state, and in turn retaining the isolating valve 86 in the isolating state.

To couple an alternative soldering tool element or other working tool element to the housing 73, the latching element 105 is manually pivoted in the direction of the arrow F from the latching state into the non-latching state, thereby permitting movement of the abutment element 102 along the fuel gas outlet tube 82 against the action of the compression spring 104, so that the replacement soldering tool element or other working tool element can be coupled to the housing 73. Coupling of the replacement soldering tool element or other working tool element to the housing 73 urges the abutment element 102 from the second state to the first state, and the side face 117 of the abutment element 102 engages the first engagement end 109 of the latching element 105 to thereby retain the latching element 105 in the non-latching state with the second engagement end 110 free to slide within the bore 113 of the switching element 89. With the latching element 105 in the non-latching state, the switching element 89 is operable between the first and the second states.

While the gas powered tools have been described as soldering tools, the gas powered tools may be any other type of gas powered tool, for example, a glue gun. In which case the working tool element would be provided in the form of a glue melting and dispensing tool element. It will also of course be appreciated that while the working tool elements have been described as comprising soldering tool elements, any other working tool elements, for example, a heated knife element, a blow torch element, a hot air blower element, a welding tool element for welding plastics materials together or other such working tool elements or the like may be provided to be coupleable to the housing of the gas powered tool.

While the latching elements of the gas powered tools have been described as comprising either a pivotally mounted latching element, or a rotatably mounted latching element, any other suitable latching element for latching the operating element of the isolating valve in the first state or for latching the isolating valve in the isolating state directly or indirectly may be provided. Such a latching element may, for example, be provided by a slideably mounted latching element which would be slideable between a latching state and an non-latching state, and would be responsive to decoupling of a working tool element from the housing to operate from a non-latching state to the latching state, or the latching elements may be provided by any other suitable latching element.

While the gas powered tools have been described as comprising a cylindrical housing and a tubular housing, which forms a hand grip for gripping the gas powered tools, the housing of the gas powered tools may comprise a housing of any other suitable shape or construction. Indeed, in certain cases, it is envisaged that the housing may be of pistol shaped, having a palm engageable handle element within which the fuel gas reservoir, for example, may be located, and a transversely extending element, similar to the barrel of a pistol from which the working tool elements would extend.

It is also envisaged that in some embodiments of the gas powered tool, the fuel gas source, instead of being provided by liquid fuel gas stored in a fuel gas reservoir located in the housing of the gas powered tool, the fuel gas source could be provided externally of the gas powered tool, and could, for example, be connected to the gas powered tool by a flexible conduit. In which case, it is envisaged that the isolating valve and the operating element for the isolating valve would be located in the housing of the gas powered tool.

While the soldering tool elements have been described as defining coupling rotational axes about which the soldering tool elements are rotatable for coupling and decoupling the soldering tool elements to the housing of the gas powered soldering tool, it is not necessary that the soldering tool elements should define a coupling rotational axis. In fact, the soldering tool elements may be offset from or at an angle to the coupling rotational axis. All that is required is that the coupling mechanism which couples the soldering tool elements to the housing of the gas powered soldering tool, should define the coupling rotational axis.

It is also envisaged that any other suitable coupling mechanism for coupling the soldering tool elements or any other working tool elements to the housing of the gas powered soldering tools may be provided, besides bayonet connectors and spring loaded ball connectors. Indeed, in some embodiments of the invention, it is envisaged that the coupling mechanisms may be provided by screw threads, whereby the coupling mechanism would be externally threaded to engage an internally threaded bore, in the housing of the gas powered tool.

The invention claimed is:

1. A gas powered tool comprising a housing, a fuel gas supply means located in the housing, an isolating valve located in the housing, the isolating valve being selectively operable between an isolating state isolating the fuel gas supply means from a fuel gas source and an open state communicating the fuel gas supply means with the fuel gas source, a working tool element comprising a burner element, the working tool element being releasably coupleable to the housing with the burner element communicating with the fuel gas supply means, and a latching element responsive to decoupling of the working tool element from the housing for retaining the isolating valve in the isolating state.

2. A gas powered tool as claimed in claim 1 in which the latching element is operable into a latching state in response to decoupling of the working tool element from the housing for retaining the isolating valve in the isolating state.

3. A gas powered tool as claimed in claim 2 in which an operating element operable between a first state and a second state is co-operable with the isolating valve for operating the isolating valve from the isolating state to the open state in response to the operating element being urged from the first state to the second state, and, the latching element is co-operable with the operating element for retaining the operating element in the first state when the latching element is in the latching state, and advantageously, the latching element is engageable with the operating element in the first state.

4. A gas powered tool as claimed in claim 1 in which the working tool element comprises one of a soldering tool element, a heated knife element, a blow torch element, a hot air blower element and a welding tool element for welding plastics materials together.

5. A method for retaining an isolating valve of a gas powered tool in an isolating state isolating a fuel gas supply means from a fuel gas source in response to decoupling of a working tool element from the gas powered tool, the method comprising operating a latching element for retaining the isolating valve in the isolating state in response to decoupling of the working tool element from the gas powered tool.

6. A gas powered tool as claimed in claim 2 in which the latching element is operable from the latching state to a non-latching state permitting operation of the isolating valve between the isolating state and the open state.

7. A gas powered tool as claimed in claim 6 in which the latching element is urged from the latching state to the non-latching state by the working tool element being coupled to the housing.

8. A gas powered tool as claimed in claim 6 in which the latching element is pivotal between the latching state and the non-latching state.

9. A gas powered tool as claimed in claim 6 in which the working tool element is releasably coupleable to the housing by a coupling mechanism rotatable about a coupling rotational axis, and the latching element is urgeable between the latching state and the non-latching state in response to rotation of the coupling mechanism about the coupling rotational axis.

10. A gas powered tool as claimed in claim 6 in which the latching element is operable into the latching state from the non-latching state in response to decoupling of the working tool element from the housing.

11. A gas powered tool as claimed in claim 6 in which the latching element is manually operable from the latching state to the non-latching state.

12. A gas powered tool as claimed in claim 6 in which the latching element is operable from the latching state to the non-latching state in response to coupling of the working tool element to the housing.

13. A gas powered tool as claimed in claim 6 in which the latching element is configured to be retained in the non-latching state by the working tool element being coupled to the housing.

14. A gas powered tool as claimed in claim 1 in which the latching element is configured to prevent decoupling of the working tool element from the housing when the isolating valve is in the open state.

15. A gas powered tool as claimed in claim 3 in which the latching element is engageable with the operating element in the first state when the latching element is in the latching state for retaining the operating element in the first state.

16. A gas powered tool as claimed in claim 3 in which the latching element is co-operable with the working tool element and the operating element for preventing decoupling of the working tool element from the housing until the operating element is in the first state.

17. A gas powered tool as claimed in claim 6 in which the latching element is rotatable about a latching rotational axis between the latching state and the non-latching state.

18. A gas powered tool as claimed in claim 17 in which the latching element is rotatable about the latching rotational axis from the non-latching state to the latching state in response to the decoupling action of the working tool element as the working tool element is being decoupled from the housing.

19. A gas powered tool as claimed in claim 2 in which the latching element is biased into the latching state.

20. A gas powered tool as claimed in claim 2 in which a camming means is provided for urging the latching element into the latching state.

* * * * *